United States Patent
Ishii et al.

(10) Patent No.: US 8,644,815 B2
(45) Date of Patent: Feb. 4, 2014

(54) MOBILE STATION AND MOBILE COMMUNICATION METHOD FOR DETERMINING RADIO LINK FAILURE

(75) Inventors: Hiroyuki Ishii, Yokosuka (JP); Mikio Iwamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 275 days.

(21) Appl. No.: 13/127,646

(22) PCT Filed: Nov. 4, 2009

(86) PCT No.: PCT/JP2009/068836
§ 371 (c)(1),
(2), (4) Date: Jul. 12, 2011

(87) PCT Pub. No.: WO2010/053095
PCT Pub. Date: May 14, 2010

(65) Prior Publication Data
US 2011/0263245 A1    Oct. 27, 2011

(30) Foreign Application Priority Data
Nov. 4, 2008   (JP) .............................. P2008-283782

(51) Int. Cl.
*H04W 24/00*    (2009.01)
*H04W 72/00*    (2009.01)
*H04W 4/00*     (2009.01)

(52) U.S. Cl.
USPC ........... 455/423; 455/425; 455/450; 370/242; 370/332

(58) Field of Classification Search
USPC ................. 455/423, 425, 436–438, 443, 450, 455/452.1, 452.2, 456.4, 456.5; 370/206, 370/208, 242, 247, 248, 251, 310.2, 311, 370/324, 328, 331, 332, 336
See application file for complete search history.

(56) References Cited

U.S. PATENT DOCUMENTS

| 2005/0249123 A1* | 11/2005 | Finn .............................. 370/242 |
| 2005/0281222 A1* | 12/2005 | Ranta-Aho et al. ........... 370/328 |
| 2007/0195733 A1* | 8/2007 | Noh .............................. 370/331 |
| 2008/0074994 A1* | 3/2008 | Jen ............................... 370/218 |

(Continued)

FOREIGN PATENT DOCUMENTS

| EP | 1903821 A2 | 3/2008 |
| WO | 2007/129180 A2 | 11/2007 |

OTHER PUBLICATIONS

Extended European Search Report for European Application No. 09824794.3 dated May 4, 2012 (8 pages).

(Continued)

*Primary Examiner* — Wesley Kim
(74) *Attorney, Agent, or Firm* — Osha Liang LLP

(57) ABSTRACT

In a mobile station (UE) according to the present invention, when a synchronization state determination unit notifies that a downlink synchronization state is a non-synchronization state; (1) when a first timer has expired, and when a second timer is being activated, a radio link failure state determination unit is configured to stop the second timer, and to determine that a current state is a radio link failure state; (2) when the first timer is being activated, and when the second timer is being activated, the radio link failure state determination unit is configured to stop the second timer; or (3) when the first timer is not being activated, the radio link failure state determination unit is configured to start the first timer.

6 Claims, 13 Drawing Sheets

(56) References Cited

U.S. PATENT DOCUMENTS

| | | | |
|---|---|---|---|
| 2008/0076404 A1* | 3/2008 | Jen | 455/423 |
| 2008/0167042 A1* | 7/2008 | Kitazoe | 455/436 |
| 2009/0191874 A1* | 7/2009 | Du et al. | 455/436 |
| 2011/0211458 A1* | 9/2011 | Ishii et al. | 370/242 |

OTHER PUBLICATIONS

International Search Report w/translation from PCT/JP2009/068836 dated Dec. 1, 2009 (2 pages).

3GPP TS 25.331 V8.4.0; "3rd Generation Partnership Project; Technical Specification Group Radio Access Network; Radio Resource Control (RRC); Protocol specification (Release 8)" Sep. 2008; pp. 283-284 (3 pages).

3GPP TS 36.321 V8.2.0; "3rd Generation Partnership Project; Technical Specification Group Radio Access Network; Evolved Universal Terrestrial Radio Access (E-UTRA) Medium Access Control (MAC) protocol specification (Release 8)"; May 2008 (33 pages).

3GPP TS 36.214 V8.3.0; "3rd Generation Partnership Project; Technical Specification Group Radio Access Network; Evolved Universal Terrestrial Radio Access (E-UTRA); Physical layer—Measurements (Release 8)"; May 2008 (11 pages).

3GPP TS 36.213 V8.3.0; "3rd Generation Partnership Project; Technical Specification Group Radio Access Network; Evolved Universal Terrestrial Radio Access (E-UTRA); Physical layer procedures (Release 8)"; May 2008 (45 pages).

Written Opinion from PCT/JP2009/068836 dated Dec. 1, 2009 (3 pages).

3GPP TS 25.331 V8.2.0; "Universal Mobile Telecommunications System (UMTS); Radio Resource Control (RRC); Protocol Specification (Release 8)"; Mar. 2008 (1489 pages).

3GPP TS 25.214 V8.1.0; "3rd Generation Partnership Project; Technical Specification Group Radio Access Network; Physical Layer Procedures (FDD) (Release 8)"; Mar. 2008 (87 pages).

* cited by examiner

|  | $N313_1$ | T313 | $N315_2$ |
|---|---|---|---|
| DISCONTINUOUS RECEPTION PARAMETER | 5 | 3 sec. | 1 |
| NON-DISCONTINUOUS RECEPTION PARAMETER | 20 | 5 sec. | 2 |

PRIOR ART

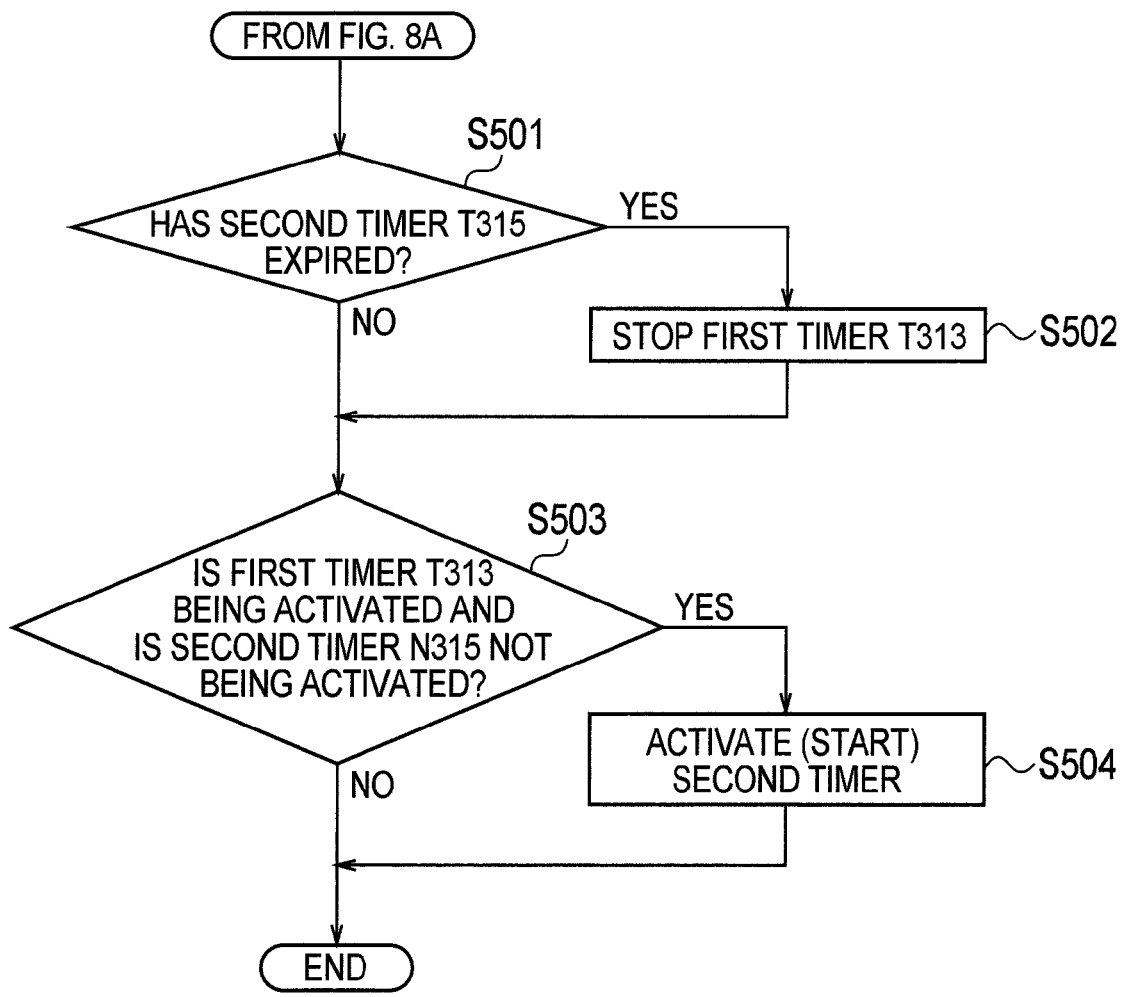

MOBILE STATION AND MOBILE COMMUNICATION METHOD FOR DETERMINING RADIO LINK FAILURE

TECHNICAL FIELD

The present invention relates to a mobile station and a mobile communication method.

BACKGROUND ART

In general, a mobile communication system is configured to monitor a synchronization state between a radio base station and a mobile station. For example, in a mobile communication system of the WCDMA scheme, the following two indexes are defined to determine a downlink synchronization state in a physical layer.

Dedicated physical control channel (DPCCH) quality
Cyclic redundancy check (CRC) check result In this case, the DPCCH quality corresponds to reception quality of pilot symbols or TPC (transmission power control) bits, for example, an SIR (signal-to-interference power ratio) or a reception level, and the CRC check result corresponds to a block error rate.

A determination interval for determining the downlink synchronization state in the physical layer, for example, is 160 ms. As described below, the determination for the radio link failure (RLF) state in the RRC layer is performed based on the determination result of the downlink synchronization state of every 10 ms.

That is, in the mobile communication system of the WCDMA scheme, the determination for the radio link failure state in the RRC layer based on the downlink synchronization state reported from the above-described physical layer is defined, and the operation of the mobile station UE in the radio link failure state is also defined.

The determination for the radio link failure state in the RRC layer described above and the operation of the mobile station UE in the radio link failure state will be described with reference to FIG. 14.

In step S102, when continuously receiving "Out-of-sync" from a physical layer N313 times, that is, a report of "synchronization state: NG" (S102: YES), the mobile station UE activates a timer T313 (S104). Steps S102 and S104 may be performed only when the timer T313 is not activated.

Meanwhile, in step S106, when continuously receiving "In-sync" from the physical layer N315 times, that is, a report of "synchronization state: OK" (S106: YES), the mobile station UE stops the timer T313 (S108). Steps S106 and S108 may be performed only when the timer T313 is activated.

When the T313 expires (step S110: YES), the present operation proceeds to step S112. However, when T313 has not expired (step S110: NO), the present operation returns to step S102. Step S110 may be performed both when the T313 is activated and when the T313 is not activated.

The processes of steps S102 to S110 may be always performed when a radio base station eNB and the mobile station UE are in a connection state. Alternatively, the processes of steps S102 and S110 may be performed when the radio base station eNB and the mobile station UE are in the connection state and at every 10 ms. Here, 10 ms indicates one radio frame. In addition, the connection state may be an RRC_Connected state.

In step S112, the mobile station UE regards the communication state between the radio base station eNB and the mobile station UE as the radio link failure state.

The radio link failure state may be called an RLF (Radio Link Failure) state, and refers to a state in which a communication quality between the radio base station eNB and the mobile station UE considerably deteriorates and thus communication is not possible.

In step S114, the mobile station UE clears the communication configuration between the radio base station eNB and the mobile station UE.

In step S116, the mobile station UE performs reconnection process. Here, the reconnection process may be called "Cell Update process". In addition, the mobile station UE may perform the reconnection process, when there is no process being performed or when the operation in the radio link failure state is not defined during a process being performed.

In such a case, the mobile station UE performs the operation in the radio link failure state during the process being performed, when there is process being performed and when the operation in the radio link failure state is defined during the process being performed.

The above-described parameters such as T313, T315 and N313 correspond to hysteresis or the number of protection steps, and are used for determining the radio link failure state with high accuracy and at an appropriate timing.

However, the mobile communication system adopts discontinuous reception (DRX) control, in order to reduce the power consumption of the mobile station UE, that is, for battery saving purpose.

For example, in a mobile communication system of the LTE (Long Term Evolution) scheme which is the next generation of the WCDMA scheme, the discontinuous reception control is applied while the radio base station eNB and the mobile station UE are connected to each other and when there is no data to be communicated, and the mobile station UE in the discontinuous reception state is configured to receive a downlink control signal transmitted via a physical downlink control channel (PDCCH) periodically, that is, discontinuously.

In such a case, since the mobile station UE has only to receive the downlink control signal transmitted via the physical downlink control channel PDCCH discontinuously, instead of all timings, the power consumption of the battery can be reduced.

In more detail, as shown in FIG. 15, the mobile station UE is configured to receive the downlink control signal transmitted via the physical downlink control channel PDCCH, and other transceivers are configured to be turned off, only at the reception interval (5 ms in the example of FIG. 15) set in each DRX cycle (1280 ms in the example of FIG. 15). As a consequence, the power consumption of the battery of the mobile station UE can be reduced. The reception interval may be called On-duration.

SUMMARY OF THE INVENTION

Problems to be Solved by the Invention

As described above, the radio link failure state in the RRC layer is determined with high accuracy and at an appropriate timing by the parameter corresponding to the hysteresis or the number of protection steps.

On the other hand, as described above, the mobile communication system adopts the discontinuous reception control, while the radio base station eNB and the mobile station UE are being connected to each other. That is, the state of each mobile station UE includes two types of states a discontinuous reception state and a non-discontinuous reception state according to the presence or absence of data to be communicated.

Here, the mobile station UE in the discontinuous reception state is generally configured to determine the downlink synchronization state described above only at the reception interval in the discontinuous reception control, in order to maintain the battery saving effect by the discontinuous reception control.

That is, in the non-discontinuous reception state, the downlink synchronization state is notified from the physical layer to the RRC layer very frequently, for example, at every 10 ms. Meanwhile, in the discontinuous reception state, the downlink synchronization state is notified only at the reception interval in the discontinuous reception control.

As described above, when the mobile station UE is in the discontinuous reception state, since a notification is less frequently sent from the physical layer, it may not be possible to appropriately perform the determination using the parameters corresponding to the hysteresis or the number of the protection steps in the RRC layer.

Therefore, the present invention is intended to overcome the above-described problem. An object of the present invention is to provide a mobile station and a mobile communication method in which a radio link failure state can be appropriately determined in a discontinuous reception state.

Means for Solving the Problem

A first aspect of the present invention is summarized as a mobile station communicating with a radio base station, the mobile station including: a synchronization state determination unit configured to determine a downlink synchronization state, based on a radio quality of a serving cell for the mobile station; a radio link failure state determination unit configured to determine whether or not a current state is a radio link failure state, based on the determination result; and a connection re-establishment unit configured to re-establish a connection to the radio base station, when the radio link failure state determination unit determines that the current state is the radio link failure state, wherein when the synchronization state determination unit notifies that the downlink synchronization state is a non-synchronization state, (1) when a first timer has expired, and when a second timer is being activated, the radio link failure state determination unit is configured to stop the second timer, and to determine that the current state is the radio link failure state; (2) when the first timer is being activated, and when the second timer is being activated, the radio link failure state determination unit is configured to stop the second timer; or (3) when the first timer is not being activated, the radio link failure state determination unit is configured to start the first timer.

In the first aspect of the present invention, when the synchronization state determination unit notifies that the downlink synchronization state is a synchronization state, (1) when the second timer has expired, the radio link failure state determination unit can be configured to stop the first timer; or (2) when the first timer is being activated, and when the second timer is not being activated, the radio link failure state determination unit can be configured to start the second timer.

In the first aspect of the present invention, the first timer and the second timer can be set separately to a discontinuous reception state and a non-discontinuous reception state, respectively.

In the first aspect of the present invention, the synchronization state determination unit can be configured to determine the downlink synchronization state in an ON-duration of the discontinuous reception state, when the mobile station is in a discontinuous reception state; and the radio link failure state determination unit can be configured to determine that the current state is the radio link failure state in the ON-duration of the discontinuous reception, which is the nearest from a timing at which the first timer has expired, when the mobile station is in a discontinuous reception state.

In the first aspect of the present invention, the synchronization state determination unit can be configured to determine the downlink synchronization state in an ON-duration of the discontinuous reception state, when the mobile station is in a discontinuous reception state; and the radio link failure state determination unit can be configured to stop the first timer in the ON-duration of the discontinuous reception, which is the nearest from a timing at which the second timer has expired, when the mobile station is in a discontinuous reception state.

A second aspect of the present invention is summarized as a mobile communication method for communication between a radio base station and a mobile station, the mobile communication method including the steps of: (A) determining, at the mobile station, a downlink synchronization state, based on radio quality of a serving cell in the mobile station; (B) determining, at the mobile station, whether or not a current state is a radio link failure state, based on the downlink synchronization state; and (C) re-establishing a connection to the radio base station, when it is determined that the mobile station is in the radio link failure state, wherein when it is determined that the downlink synchronization state is a non-synchronization state in the step (A), when a first timer has expired, and when a second timer is being activated, the mobile station stops the second timer and determines that the current state is the radio link failure state, in the step (B); when it is determined that the downlink synchronization state is a non-synchronization state in the step (A), when the first timer is being activated, and when the second timer is being activated, the mobile station stops the second timer, in the step (B); and when it is determined that the downlink synchronization state is a non-synchronization state in the step (A), when the first timer is not being activated, the mobile station starts the first timer, in the step (B).

Effect of the Invention

As described above, according to the invention, it is possible to provide a mobile station and a mobile communication method, in which a radio link failure state can be appropriately determined in a discontinuous reception state.

BRIEF DESCRIPTION OF THE DRAWINGS

FIG. 19 is a flowchart illustrating the operation of the mobile station according to the first embodiment of the present invention.

BEST MODES FOR CARRYING OUT THE INVENTION (Configuration of Mobile Communication System According to First Embodiment of the Present Invention)

With reference to FIG. 1 to FIG. 7, the configuration of the mobile communication system according to the first embodiment of the present invention will be described.

Figure 1:
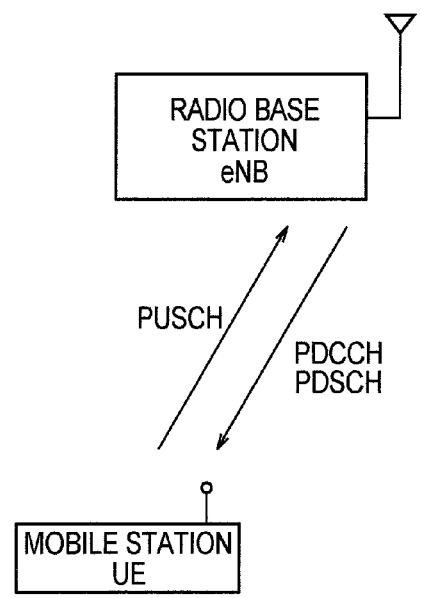
FIG. 1 is a diagram showing the entire configuration of a mobile communication system according to a first embodiment of the present invention.

As shown in FIG. 1, a mobile communication system according to the embodiment is a mobile communication system of the LTE scheme. In the mobile communication system, it has been considered that in terms of a radio access scheme, the "OFDM (Orthogonal Frequency Division Multiplexing) scheme" is applied to a downlink, and the "SC-FDMA (Single-Carrier Frequency Division Multiple Access) scheme" is applied to an uplink.

According to the OFDM scheme, a specific frequency band is divided into a plurality of narrow frequency bands (sub-carriers) and data is loaded on each frequency band and is transmitted. According to the OFDM scheme, the sub-carriers are densely arranged on the frequency axis without interference therebetween although a part of the sub-carriers overlap each other, so that high-rate transmission can be achieved and frequency use efficiency can be improved.

Furthermore, in the SC-FDMA scheme, a specific frequency band is divided and a plurality of mobile stations UE transmit data using different frequency bands, so that it is possible to reduce interference among the plurality of mobile stations UE. According to the SC-FDMA scheme, because of its characteristic of small variation in transmission power, it is possible to achieve low power consumption and broad coverage of the mobile station UE.

In the mobile communication system according to the embodiment, the mobile base station eNB is configured to transmit a downlink control signal via the physical downlink control channel PDCCH, and to transmit a downlink data signal via a PDSCH (Physical Downlink Shared Channel).

Furthermore, in the mobile communication system according to the embodiment, the mobile station UE is configured to transmit an uplink data signal via a PUSCH (Physical Uplink Shared Channel).

Figure 2:
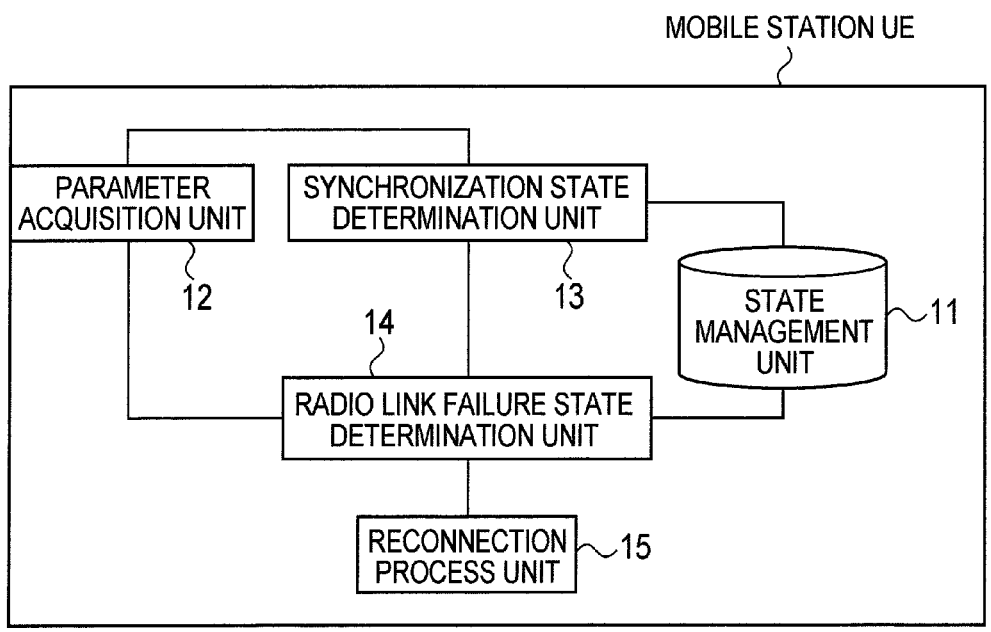
FIG. 2 is a functional block diagram of a mobile station according to the first embodiment of the present invention.

As shown in FIG. 2, the mobile station UE includes a state management unit 11, a parameter acquisition unit 12, a synchronization state determination unit 13, a radio link failure state determination unit 14, and a reconnection process unit 15.

The state management unit 11 is configured to manage whether or not the mobile station UE is in the discontinuous reception state. The state management unit 11 is configured to notify, to the synchronization state determination unit 13 and the radio link failure state determination unit 14, whether or not the mobile station UE is in the discontinuous reception state, that is, whether the mobile station UE is in the discontinuous reception state or the non-discontinuous reception state.

The fact that the mobile station UE is in the non-discontinuous reception state may represent that the mobile station UE is in an active state. For example, the active state is defined in the 3GPP TS36.321, V8.2.0, Chapter 5.7. In such a case, a non-active state corresponds to the discontinuous reception state.

The parameter acquisition unit 12 is configured to acquire a discontinuous reception state parameter and a non-discontinuous reception state parameter from the radio base station eNB. The parameter acquisition unit 12 is configured to notify, to the radio link failure state determination unit 14, the discontinuous reception state parameter and the non-discontinuous reception state parameter.

The discontinuous reception state parameter and the non-discontinuous reception state parameter can be notified, as a part of broadcast information or as a part of information of RRC signaling which is dedicatedly notified to each mobile station UE in a cell.

The synchronization state determination unit 13 is configured to measure the radio quality of a serving cell for the mobile station UE, and to determine the downlink synchronization state based on the radio quality. Here, the radio quality of the serving cell in the mobile station UE is the quality of the radio link of the downlink between the radio base station eNB and the mobile station UE.

For example, the synchronization state determination unit 13 may be configured to measure the SIR of a signal (for example, a reference signal (RS)) from the serving cell of the mobile station UE as the radio quality of the serving cell in the mobile station UE, and to determine the synchronization state of the downlink based on the measured SIR.

More specifically, the synchronization state determination unit 13 may be configured to determine that the synchronization state of the downlink is OK, that is, In-sync, when the SIR is larger than a predetermined threshold value, and to determine that the synchronization state of the downlink is NG, that is, Out-of-sync, when the SIR is equal to or less than the predetermined threshold value.

Figure 3:
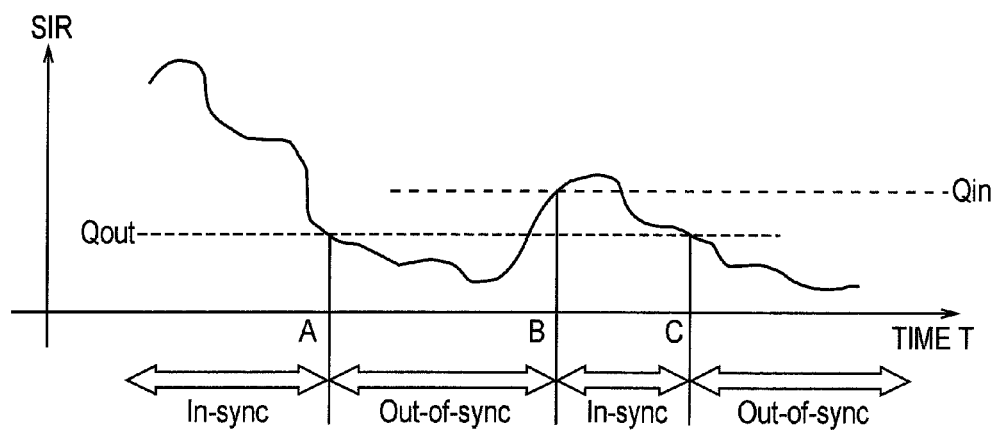
FIG. 3 is a diagram explaining how a synchronization state is determined by a synchronization state determination unit of the mobile station according to the first embodiment of the present invention.

Alternatively, as shown in FIG. 3, the synchronization state determination unit 13 may be configured to set two threshold values of Qout and Qin, and to determine the downlink synchronization state based on the above-described SIR, Qout, and Qin.

Here, a relationship of Qout<Qin is established and a difference between the Qin and the Qout, that is, "Qin−Qout", corresponds to hysteresis. That is, in the example of FIG. 3, the synchronization state determination unit 13 is configured to determine that the downlink synchronization state is the In-sync, because the SIR is larger than the Qout at T<A, and to determine that the downlink synchronization state is the Out-of-sync, based on the fact that the SIR becomes equal to or less than the Qout at the time T=A.

Then, the synchronization state determination unit 13 is configured to determine that the downlink synchronization state is In-sync, based on the fact that the SIR becomes larger than the Qin at the time T=B, and thereafter, to determine that the downlink synchronization state is Out-of-sync, based on the fact that the SIR becomes equal to or less than the Qout at the time T=C.

Thus, the two threshold values are set, that is, the hysteresis of "Qin−Qout" is set, so that it is possible to reduce instability in the determination regarding the In-sync and the Out-of-sync.

It is noted that the synchronization state determination unit 13 may be configured to use a value obtained by averaging instantaneous SIRs in a predetermined average interval as the value of the above-described SIR. Here, the predetermined average interval may be 160 ms, 200 ms, 20 ms, or other values.

The value of the SIR may be an average value in the entire system band in a frequency direction, or may be an average value in a part of the system band. The part of the system band, for example, may be a band positioned at the center of the system band and having a predetermined bandwidth. Alternatively, the part of the system band, for example, may be a band in which a synchronization signal or a physical broadcast channel is transmitted.

Meanwhile, when the mobile station UE is in the non-discontinuous reception state, the synchronization state determination unit 13 may be configured to determine the downlink synchronization state using an average SIR in the average interval of 160 ms. When the mobile station UE is in the discontinuous reception state, the synchronization state determination unit 13 may be configured to determine the downlink synchronization state using an SIR in an On-duration of the discontinuous reception control.

It is noted that the SIR in the On-duration of the discontinuous reception control may be an instantaneous SIR in the On-duration, an average SIR in the On-duration, or a value obtained by averaging SIRs in a plurality of On-durations.

The synchronization state determination unit 13 is configured to notify, to the radio link failure state determination unit 14, the determination result (In-sync/Out-of-sync) regarding the downlink synchronization state.

In addition, the synchronization state determination unit 13 may be configured to notify, to the radio link failure state determination unit 14, the determination result (In-sync/Out-of-sync) regarding the downlink synchronization state at every 10 ms. Here, 10 ms is for illustrative purposes only and values other than 10 ms may be employed.

Furthermore, the synchronization state determination unit 13 may be configured to notify, to the radio link failure state determination unit 14, the determination result (In-sync/Out-of-sync) regarding the downlink synchronization state for every radio link frame.

Meanwhile, when the mobile station UE is in the non-discontinuous reception state, the synchronization state determination unit 13 may be configured to notify, to the radio link failure state determination unit 14, the determination result regarding the downlink synchronization state at every 10 ms. When the mobile station UE is in the discontinuous reception state, the synchronization state determination unit 13 may be configured to notify, to the radio link failure state determination unit 14, the determination result regarding the downlink synchronization state in every DRX cycle.

Here, the fact that "notifying the determination result regarding the downlink synchronization state in every DRX cycle", for example, may indicate "notifying the determination result regarding the downlink synchronization state at the timing of On-duration existing in every DRX cycle".

In addition, the synchronization state determination unit 13 is configured to acquire information regarding whether or not the mobile station UE is in the discontinuous reception state, from the state management unit 11.

Furthermore, in the above-described example, the synchronization state determination unit 13 is configured to use the SIR of the reference signal as the radio quality of the serving cell. However, instead of this, a reference signal received power (RSRP), a reference signal received quality (RSRQ), or a CQI may be used.

Alternatively, instead of the SIR of the reference signal, the synchronization state determination unit 13 may is configured to use an error rate of the PDCCH, an error rate of a PCFICH, an SIR in the PCFICH, an error rate of the PDSCH, a symbol error rate of a DL RS, and the like.

Alternatively, as the radio quality of the serving cell, the synchronization state determination unit 13 may is configured to use at least one of the SIR of the reference signal, the reference signal received power, the RSRQ, the CQI, the error rate of the PDCCH, the error rate of the PCFICH, the SIR of the PCFICH, the error rate of the PDSCH, and the symbol error rate of the DL RS.

It is noted that the RSRQ (Reference Signal Received Quality Power) is a value obtained by dividing the reference signal received power of a downlink by an RSSI (Received Signal Strength Indicator) of the downlink. Here, the RSSI indicates the total reception level measured in a mobile station, and includes all of thermal noise, interference power from another cell, power of a desired signal from an own cell and the like (see the 3GPP TS36.214, V8.3.0 for the definition of the RSRQ). In addition, the CQI (Channel Quality Indicator) indicates radio quality information of the downlink (see the 3GPP TS 36.213, V 8.3.0 for the definition of the CQI).

The radio link failure state determination unit 14 is configured to determine whether or not the current communication state is the radio link failure state, based on the determination result of the downlink synchronization state by the above-described synchronization state determination unit 13 and the discontinuous reception state parameter and the non-discontinuous reception state parameter designated by the parameter acquisition unit 12.

For example, when the Out-of-sync is continuously reported N313 times by the synchronization state determination unit 13, the radio link failure state determination unit 14 is configured to activate a timer. When the timer has expired, the radio link failure state determination unit 14 may be configured to determine that the radio link failure state has occurred.

Figure 4:
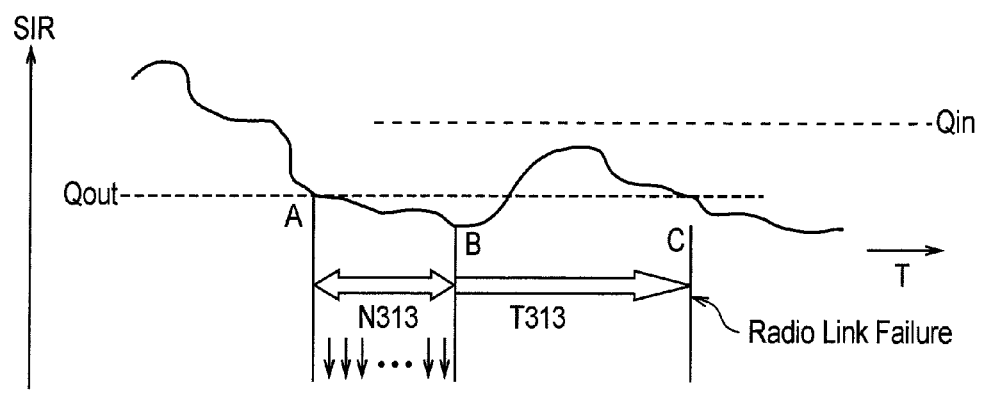
FIG. 4 is a diagram explaining how a radio link failure is determined by a radio link failure state determination unit of the mobile station according to the first embodiment of the present invention.

More specifically, as illustrated in FIG. 4, the radio link failure state determination unit 14 continuously receives a notification indicating the Out-of-sync N313 times as the downlink synchronization state from the synchronization state determination unit 13 between the time T=A and the time T=B.

In such a case, at the time T=B, the radio link failure state determination unit 14 activates the timer T313. Then, when the timer T313 expires (at the time T=C), the radio link failure state determination unit 14 determines that the current communication state is the radio link failure state. The timer T313 corresponds to a first timer.

Figure 5:
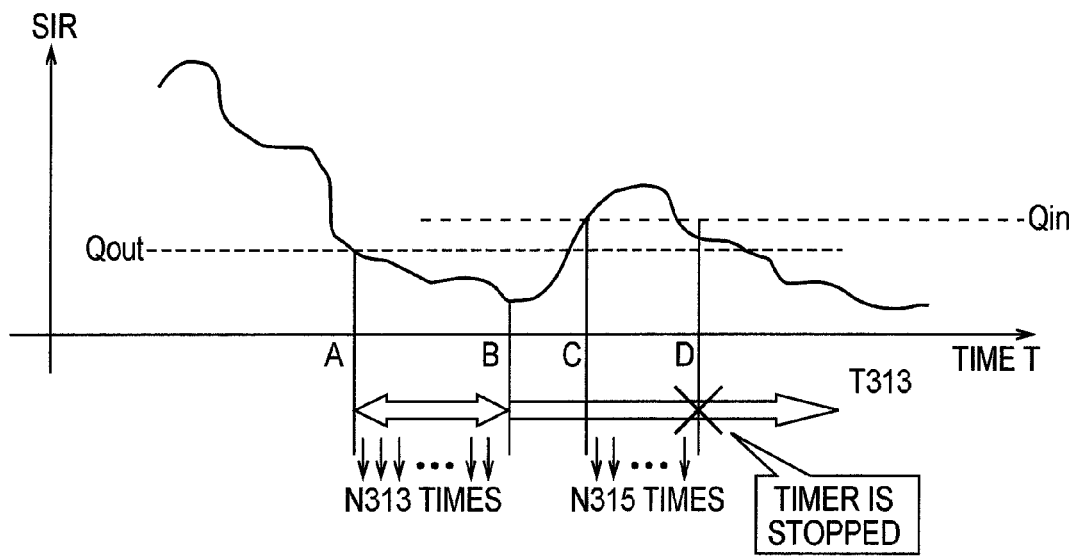
FIG. 5 is a diagram explaining how a radio link failure is determined by a radio link failure state determination unit of the mobile station according to the first embodiment of the present invention.

Here, as illustrated in FIG. 5, in the state where the timer T313 is activated, the radio link failure state determination unit 14 continuously receives a notification indicating the In-sync N315 times as the downlink synchronization state from the synchronization state determination unit 13 between the time T=C and the time T=D.

In such a case, at the time T=D, the radio link failure state determination unit 14 stops the timer T313. In such a case, since the timer T313 is stopped before the expiration, the radio link failure state determination unit 14 does not determine that the current communication state is the radio link failure state.

In addition, in the above-described example, the N313 or the N315 is a threshold value regarding the number of times by which the Out-of-sync or the In-sync is continuously notified. However, instead, the N313 or the N315 may be a threshold value regarding a time period at which the Out-of-sync or the In-sync is continuously notified. That is, the N313 or the N315 may be treated as a timer, similarly to the T313.

Figure 6:
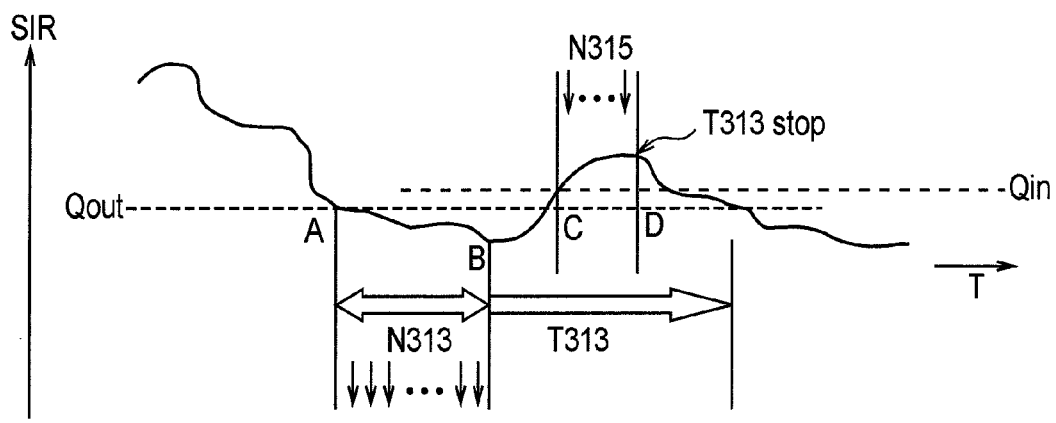
FIG. 6 is a diagram explaining how a radio link failure is determined by a radio link failure state determination unit of the mobile station according to the first embodiment of the present invention.

For example, as illustrated in FIG. 6, when a time period (B–A) from the time T=A to T=B corresponds to "N313" and the Out-of-sync is continuously notified for a time period defined as the "N313", that is, when only the Out-of-sync is notified for a time period defined as the "N313", the radio link failure state determination unit 14 may perform a process of activating the timer T313 at the time T=B.

That is, in FIG. 6, the radio link failure state determination unit 14 may activate the timer N313 at the time T=A which is the timing at which the notification indicating the Out-of-sync has been received from the synchronization state determination unit 13 as the downlink synchronization state, and may perform the process of activating the timer T313 at the time T=B, when the Out-of-sync has been continuously notified, that is, only the Out-of-sync has been notified, until the timer N313 expires, that is, while the timer N313 is activated (the time period (B–A) from the time T=A to T=B).

Furthermore, in the state where the timer N313 is being activated, when the In-sync is notified, the radio link failure state determination unit 14 may stop the timer N313.

Meanwhile, for example, in FIG. 6, when a time period (D–C) from the time T=C to T=D corresponds to "N315" and the In-sync is continuously notified for a time period defined as the "N315", that is, when only the In-sync is notified for a time period defined as the "N315", the radio link failure state determination unit 14 may perform a process of stopping the timer T313 at the time T=D. In this case, the N315 corresponds to a second timer.

That is, in FIG. 6, the radio link failure state determination unit 14 may activate the second timer N315 at the time T=C which is the timing at which the notification indicating the In-sync has been received from the synchronization state determination unit 13 as the downlink synchronization state, and may perform the process of stopping the timer T313 at the time T=D, when the In-sync has been continuously notified, that is, only the In-sync has been notified, until the second timer N315 expires, that is, while the second timer N315 is activated (the time period (D–C) from the time T=C to T=D).

Furthermore, in the state where the second timer N315 is being activated, when the Out-of-sync is notified, the radio link failure state determination unit 14 may stop the second timer N315.

That is, the number of times by which the synchronization state is notified by the synchronization state determination unit 13 may be used as the unit of the above-described N313 or N315, and instead thereof, a time period at which the synchronization state is notified by the synchronization state determination unit 13 may be used as the unit of the above-described N313 or N315.

Furthermore, in the above-described example, in order to determine whether or not the radio link failure state has occurred, the three parameters of the "N313", the "T313", and the "N315 have been defined. However, instead, at least one of the three parameters of the "N313", the "T313", and the "N315" may be used as a parameter for determining whether or not the radio link failure state has occurred.

When it is determined that the radio link failure state has occurred, the radio link failure state determination unit 14 is configured to notify the reconnection process unit 15 of the determination result.

Here, in the discontinuous reception state, the temporal relationship is shown between the determination regarding the Out-of-sync/In-sync performed by the synchronization state determination unit 13 and the determination of whether or not the radio link failure state has occurred performed by the radio link failure state determination unit 14 using the timers T313, N313 and N315.

However, in the following description, it is assumed that the N313 and the N315 are not the threshold values regarding the number of times by which the Out-of-sync or the In-sync is continuously notified as described above, but are defined as timers which are equal to the T313.

Figure 16:
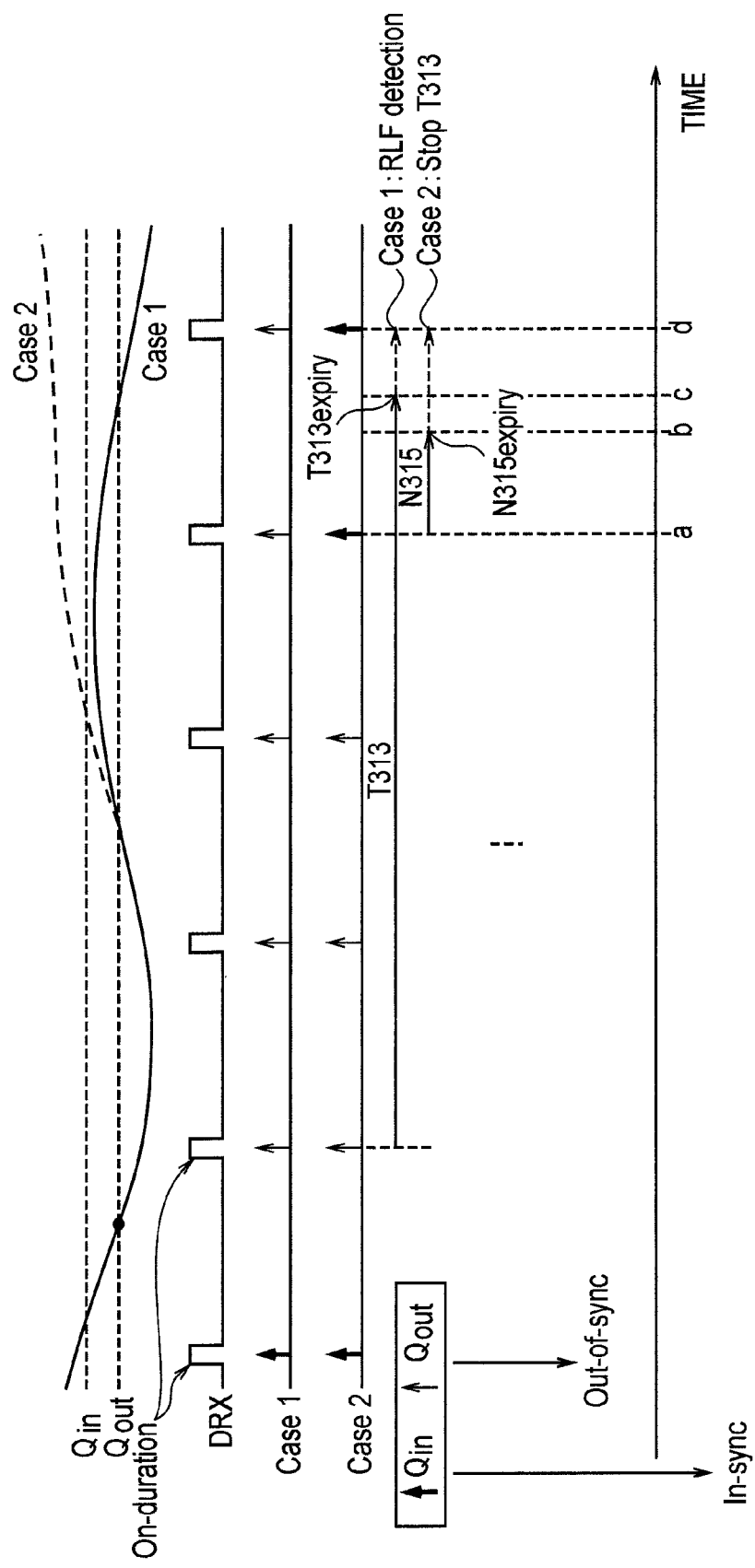
FIG. 16 is a diagram explaining how a radio link failure is determined by a radio link failure state determination unit of the mobile station according to the first embodiment of the present invention.

Furthermore, for the purpose of convenience, in FIG. 16, N313 is set to 0. That is, at the time point at which the Out-of-sync has been notified by the synchronization state determination unit 13, the radio link failure state determination unit 14 activates (starts) the first timer T313.

For example, as illustrated in the Case 1 of FIG. 16, the synchronization state determination unit 13 may determine the Out-of-sync/In-sync at the timing of the On-duration of the discontinuous reception state, and the radio link failure state determination unit 14 may determine that the radio link failure state has occurred (RFL detection in FIG. 16) in the ON-duration (d in FIG. 16) of the discontinuous reception state, which is the nearest from the timing (c in FIG. 16) at which the first timer T313 has expired.

In other words, the radio link failure state determination unit 14 may determine that the radio link failure state has occurred (RFL detection in FIG. 16) at the timing d in FIG. 16, because the notification indicating the Out-of-sync has been received from the synchronization state determination unit 13 and the first timer T313 has expired at that time point (c in FIG. 16).

Alternatively, for example, as illustrated in the Case 2 of FIG. 16, the synchronization state determination unit 13 may determine the Out-of-sync/In-sync at the timing of the On-duration of the discontinuous reception state, and the radio link failure state determination unit 14 may stop the first timer T313 in the ON-duration (d in FIG. 16) of the discontinuous reception state, which is the nearest from the timing (b in FIG. 16) at which the second timer N315 has expired.

In other words, the radio link failure state determination unit 14 may stop the first timer T313 at the timing d in FIG. 16, because the notification indicating the In-sync has been received from the synchronization state determination unit 13 and the second timer N315 has expired at that time point (b in FIG. 16).

As described above, whether or not the radio link failure state has occurred is determined in the nearest ON-duration after the first timer has expired, so that it is possible to appropriately perform the determination of whether or not the radio link failure state has occurred while maintaining the battery saving effect by the discontinuous reception.

It is noted that the discontinuous reception state parameters and the non-discontinuous reception state parameters include the "N313" which is the number of continuous Out-of-syncs for activating the timer T313, the "T313" which is a timer value for determining that the radio link failure state has occurred, the "N315" which is the number of continuous In-syncs for stopping the timer, and the like.

Figures 7, 8:
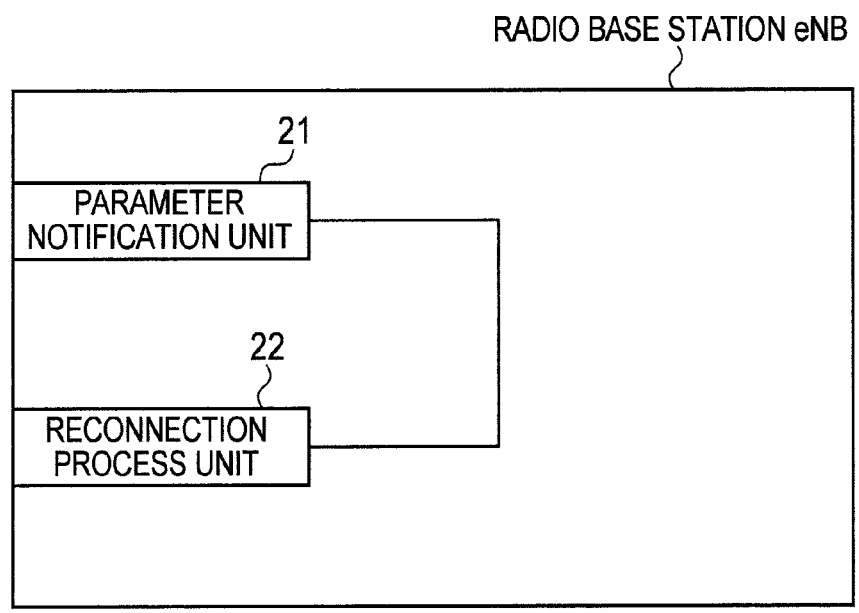
FIG. 7 is a diagram showing one example of a discontinuous reception parameter and a non-discontinuous reception parameter used in the mobile station according to the first embodiment of the present invention.
FIG. 8 is a functional block diagram of a radio base station according to the first embodiment of the present invention.

FIG. 7 is a table illustrating an example of the discontinuous reception state parameter ("N313", "T313", and "N315") and the non-discontinuous reception state parameter ("N313", "T313", and "N315").

As can be seen from the example, in the mobile communication system according to the present embodiment, the values of the discontinuous reception state parameters may be configured to be different from the values of the non-discontinuous reception state parameters.

For example, the value (N313) of a first parameter in the discontinuous reception state parameter may be configured to be smaller than the value (N313) of a first parameter in the non-discontinuous reception state parameter.

The following description will be given about the effect when the value (N313=5) of the first parameter in the discontinuous reception state parameter is set to be smaller than the value (N313=20) of the first parameter in the non-discontinuous reception state parameter.

In the discontinuous reception state, since the determination frequency for determining the downlink synchronization state is low as compared with in the non-discontinuous reception state, the interval between the determinations becomes larger.

In such a case, in order for a time period necessary for the determination to have an appropriate length, the value (N313=5) of the first parameter in the discontinuous reception state parameter has to be smaller than the value (N313=20) of the first parameter in the non-discontinuous reception state parameter.

Here, the appropriate length, for example, is a reflection time period necessary to determine that the current communication state is the radio failure state, and preferably has a small value to a maximum extent if a determination can be performed with high accuracy.

That is, as described above, the value (N313=5) of the first parameter in the discontinuous reception state parameter is configured to be smaller than the value (N313=20) of the first parameter in the non-discontinuous reception state parameter, so that a determination that the current communication state is the radio link failure state can be appropriately performed in the discontinuous reception state.

Meanwhile, the value (N313) of the first parameter in the discontinuous reception state parameter may be configured to be larger than the value (N313) of the first parameter in the non-discontinuous reception state parameter.

For example, the value (N313) of the first parameter in the discontinuous reception state parameter may be set to 10, and the value (N313) of the first parameter in the non-discontinuous reception state parameter may be set to 2.

The following description will be given about the effect when the value (N313=10) of the first parameter in the discontinuous reception state parameter is set to be larger than the value (N313=2) of the first parameter in the non-discontinuous reception state parameter.

In the discontinuous reception state, since the determination frequency for determining the downlink synchronization state is small as compared with in the non-discontinuous reception state, the number of samples needs to be increased. Here, the number of samples, for example, refers to the number of samples necessary when accurately determining that the current communication state is the radio failure state.

Consequently, as described above, the value (N313=10) of the first parameter in the parameters for the discontinuous reception state is set to be larger than the value (N313=2) of the first parameter in the parameters for the non-discontinuous reception state, so that it is possible to appropriately determine that the radio failure state has occurred in the discontinuous reception state.

In the same manner, the value (T313=3) of a second parameter in the discontinuous reception state parameters is set to be smaller than the value (T313=5) of a second parameter in the non-discontinuous reception state parameters, so that it is possible to reduce the time period required for determining that the radio failure state has occurred in the discontinuous reception state.

In addition, the value (T313) of the second parameter in the discontinuous reception state parameter is configured to be larger than the value (T313) of the second parameter in the non-discontinuous reception state parameter, so that a determination that the current communication state is the radio failure state can be appropriately performed in the discontinuous reception state.

In the same manner as this, the value (N315=1) of a third parameter in the discontinuous reception state parameter is configured to be smaller than the value (N315=2) of a third parameter in the non-discontinuous reception state parameter, so that it is possible to reduce the time period required for determining that the radio failure state has occurred in the discontinuous reception state.

In addition, the value (N315) of the third parameter in the discontinuous reception state parameter is configured to be larger than the value (N315) of the third parameter in the non-discontinuous reception state parameter, so that a determination whether or not the current communication state is the radio failure state can be appropriately performed in the discontinuous reception state.

That is, when the mobile station UE is in the discontinuous reception state, the radio link failure state determination unit is configured to determine whether or not the current communication state is the radio link failure state, based on the downlink synchronization state determined by the synchronization state determination unit 13 and the discontinuous reception state parameter acquired by the parameter acquisition unit 12.

On the other hand, when the mobile station UE is not in the discontinuous reception state, the radio link failure state determination unit 14 is configured to determine whether or not the current communication state is the radio link failure state, based on the downlink synchronization state determined by the synchronization state determination unit 13 and the non-discontinuous reception state parameter acquired by the parameter acquisition unit 12.

When the determination result indicating the current communication state is the radio link failure state is notified from the radio link failure state determination unit 14, the reconnection process unit 15 is configured to perform reconnection process. Moreover, the reconnection process unit may be configured to clear the configuration of the communication between the mobile station UE and the radio base station eNB, before performing the reconnection process.

In addition, the reconnection process may be called, for example, "Cell Update process". Furthermore, the "Cell Update process", for example, refers to process in which a cell is searched, the radio quality of the searched cell is measured, and a connection is re-established with respect to the cell when there is a communicable cell. It is noted that the "Cell Update process" may also be called a "Connection Re-establishment process".

Furthermore, the mobile station may perform the above-described reconnection process, when there is no process being performed or when the operation in the radio link failure state is not defined during a process being performed. In such a case, the mobile station may perform the operation in the radio link failure state during the process being performed, when there is process being performed and when the operation in the radio link failure state is defined during the process being performed.

As shown in FIG. 8, the radio base station eNB includes a parameter notification unit 21 and a reconnection process unit 22.

The parameter notification unit 21 is configured to notify, to the mobile station LIE, the discontinuous reception state parameter and the non-discontinuous reception state parameter described above.

In detail, the parameter notification unit 21 is configured to notify, to the mobile station UE, the discontinuous reception state parameter and the non-discontinuous reception state parameter via the physical downlink shared channel PDSCH.

It is noted that the discontinuous reception state parameter and the non-discontinuous reception state parameter may be notified, as a part of the broadcast information, or as a part of the information in a dedicated control signal, or RRC message.

The reconnection process unit 22 is configured to perform reconnection process, when the mobile station UE performs the above-described reconnection process and notifies the reconnection process unit 22 of reconnection signaling. That is, the reconnection process unit 22 is configured to perform the process of re-establishing the connection to the mobile station UE.

(Operation of the Mobile Communication System According to the First Embodiment of the Present Invention)

The operation of the mobile communication system according to the first embodiment of the present invention will be described with reference to FIG. 17 to FIG. 19. However, in the following description, it is assumed that the N313 and the N315 are not the threshold values regarding the number of times by which the Out-of-sync or the In-sync is continuously notified as described above, but are defined as timers which are equal to the T313.

Furthermore, for the purpose of convenience, in FIG. 16, N313 is set to 0. That is, at the time point at which the Out-of-sync has been notified by the synchronization state determination unit 13, the radio link failure state determination unit 14 activates (starts) the first timer T313.

Figure 18:
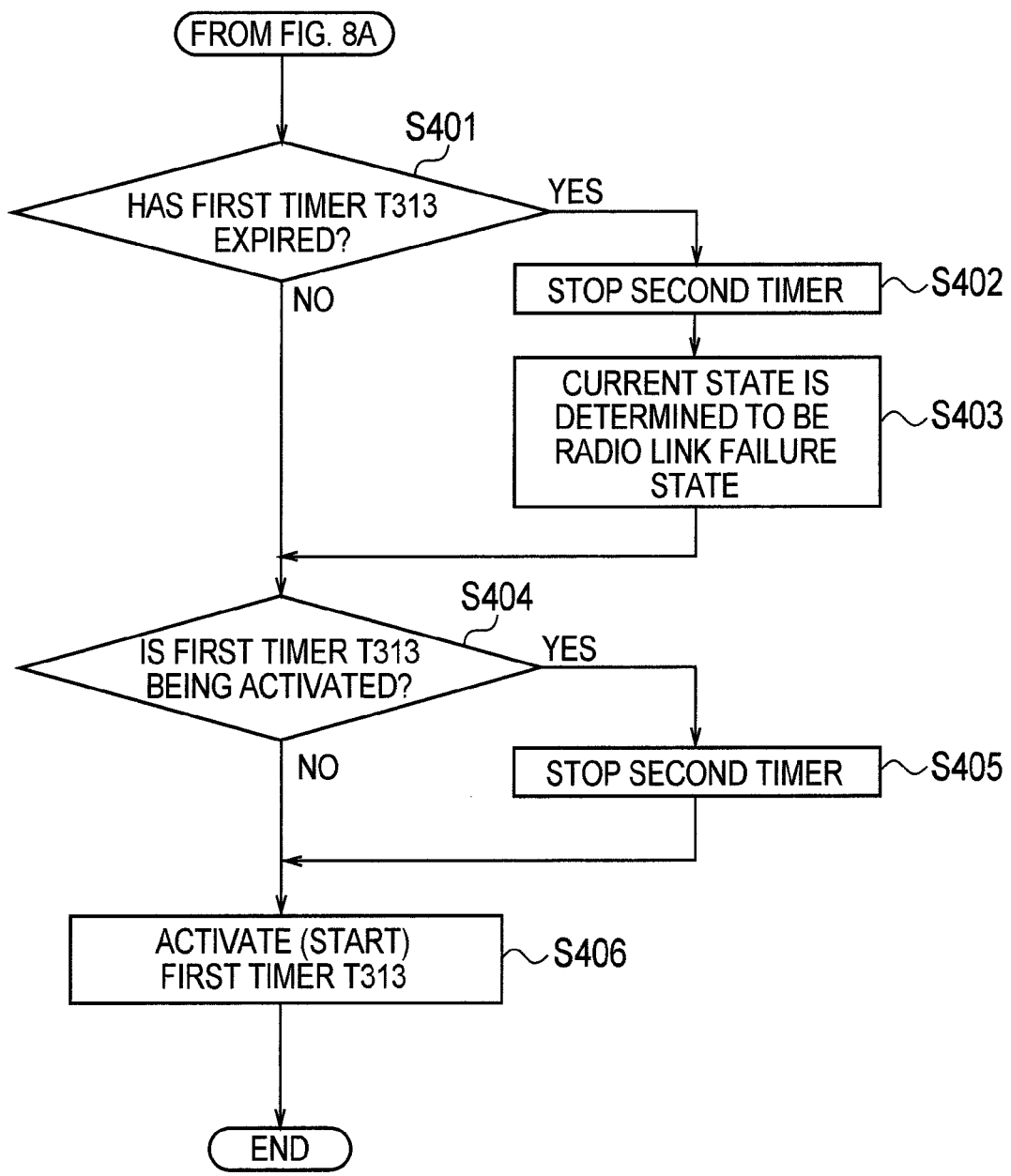
FIG. 18 is a flowchart illustrating the operation of the mobile station according to the first embodiment of the present invention.

In step S301, the radio link failure state determination unit 14 determines whether or not the Out-of-sync is notified by the synchronization state determination unit 13, and proceeds to the process of FIG. 18 when the Out-of-sync is notified (step S301: YES) while proceeding to step S302 when the Out-of-sync is not notified (step S301: NO).

In step S302, the radio link failure state determination unit 14 determines whether or not the In-sync is notified by the synchronization state determination unit 13, and proceeds to the process of FIG. 19 when the In-sync is notified (step S302: YES) while proceeding to step S303 when the In-sync is not notified (step S302: NO).

In step S303, the radio link failure state determination unit 14 determines whether or not an RA (Random Access) procedure has failed or maximum retransmission excess has occurred in an RLC layer. When the RA procedure has failed or the maximum retransmission excess has occurred in the RLC layer (step S303: YES), the radio link failure state determination unit 14 proceeds to the process of step S304. Otherwise (step S303: NO), the radio link failure state determination unit 14 terminates the process.

Next, the operation when the Out-of-sync is notified by the synchronization state determination unit 13 will be described with reference to FIG. 18.

In step S401, the radio link failure state determination unit 14 determines whether or not the first timer T313 has expired. That is, when the first timer T313 has expired (step S401: YES), the radio link failure state determination unit 14 proceeds to the process of step S402. Otherwise (step S401: NO), the radio link failure state determination unit 14 proceeds to step S404.

In step S402, the radio link failure state determination unit 14 stops the second timer N315. However, when the N315 is not being activated, this process is not performed. That is, when the second timer N315 is being activated, the radio link failure state determination unit 14 stops the N315.

In step S403, the radio link failure state determination unit 14 determines that the radio link failure state has occurred.

In step S404, the radio link failure state determination unit 14 determines whether or not the first timer T313 is being activated. That is, when the first timer T313 is being activated (step S404: YES), the radio link failure state determination unit 14 proceeds to the process of step S405. In another case (step S404: NO), the radio link failure state determination unit 14 proceeds to step S406.

In step S405, the radio link failure state determination unit 14 stops the second timer N315. However, when the N315 is not being activated, this process is not performed. That is, when the second timer N315 is being activated, the radio link failure state determination unit 14 stops the N315.

In step S406, the radio link failure state determination unit 14 activates the first timer T313. In addition, in step S406, when the first timer T313 is already activated, that is, when the determination of step S404 is YES and this process is performed via step S405, it may indicate that the state of the first timer T313 being already activated is continuously maintained.

Next, the operation when the In-sync is notified by the synchronization state determination unit 13 will be described with reference to FIG. 19.

In step S501, the radio link failure state determination unit 14 determines whether or not the second timer N315 has expired. That is, when the second timer N315 has expired (step S501: YES), the radio link failure state determination unit 14 proceeds to the process of step S502. In another case (step S501: NO), the radio link failure state determination unit 14 proceeds to step S503.

In step S502, the radio link failure state determination unit 14 stops the first timer T313. At this time, the radio link failure state determination unit may regard that the radio link state has been restored.

In step S503, the radio link failure state determination unit 14 determines whether or not the first timer T313 is being activated and the second timer N315 is not yet activated. That is, when the first timer T313 is being activated and the second timer N315 is not yet activated (step S503: YES), the radio link failure state determination unit 14 proceeds to the process of step S504. In another case (step S503: NO), the radio link failure state determination unit 14 terminates the process.

In step S504, the radio link failure state determination unit 14 activates (starts) the second timer N315.

Figure 17:
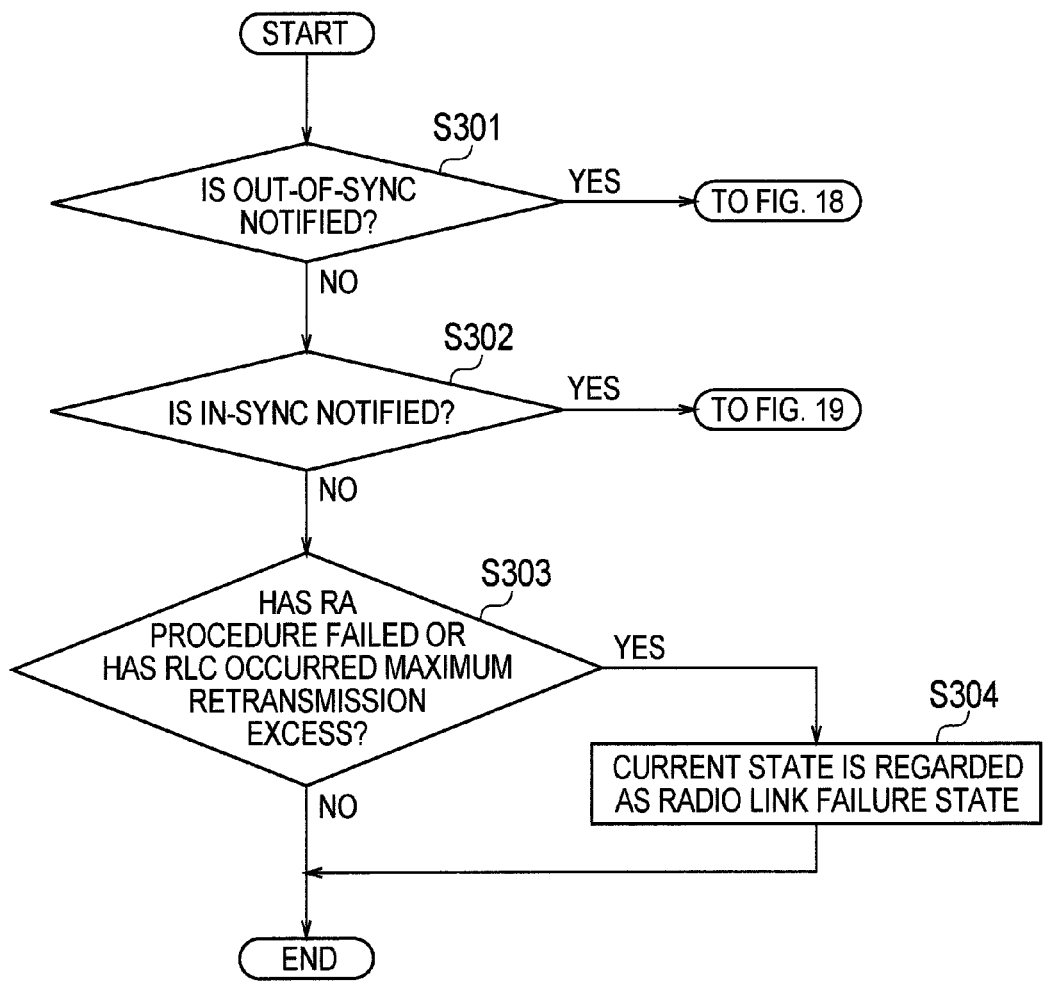
FIG. 17 is a flowchart illustrating an operation of the mobile station according to the first embodiment of the present invention.

The above-described processes illustrated in FIGS. 17, 18 and 19 are also applied both to the discontinuous reception state and the non-discontinuous reception state.

In more detail, according to the process in the discontinuous reception state described in FIG. 16, the synchronization state determination unit 13 performs the determination of the out-of-sync/In-sync in the On-duration in the discontinuous reception state, and the radio link failure state determination unit 14 performs the above-described process at the timing, at which the Out-of-sync/In-sync has been received from the synchronization state determination unit 13, based on whether the first timer T313 and the second timer N315 have expired, are being activated, or are not activated.

In such a case, for example, the timing at which the first timer T313 and the second timer N315 have expired may be different from the On-duration. In other words, when the first timer T313 and the second timer N315 have expired, the above-described processes illustrated in FIGS. 17, 18 and 19 may be performed in the On-duration which is the nearest the timing.

Figure 9:
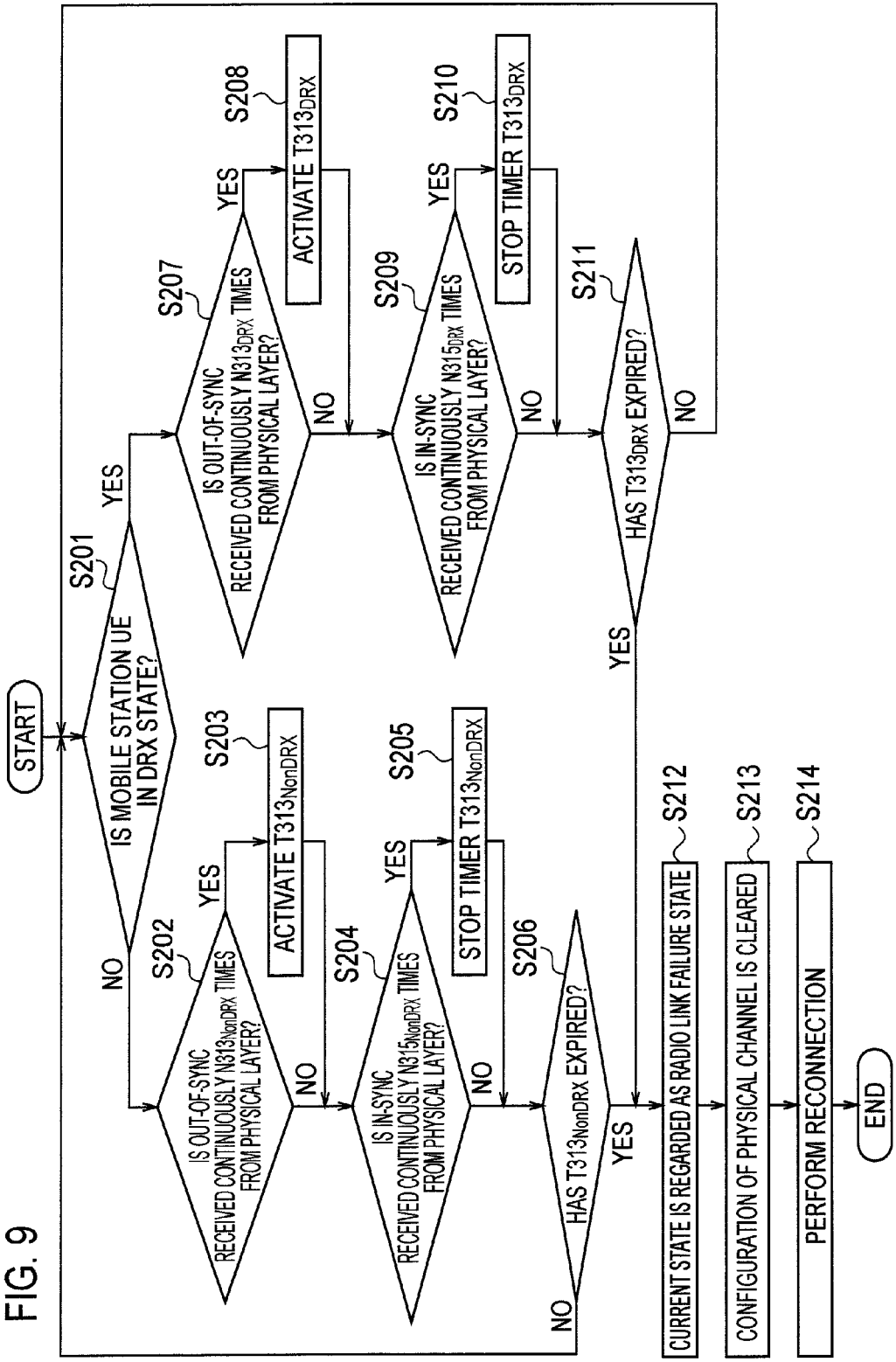
FIG. 9 is a flowchart illustrating an operation of the mobile station according to the first embodiment of the present invention.

With reference to FIG. 9, the operation of the mobile communication system according to the first embodiment of the present invention will be explained. The present operation represents an operation when two types of parameters, that is, the discontinuous reception state parameters and the non-discontinuous reception state parameters are defined as the parameters such as N313, T313 and N315 as described above.

In step S201, it is determined whether or not the mobile station UE is in the discontinuous reception state (DRX state). When the mobile station UE is not in the discontinuous reception state (DRX state), the operation proceeds to step S202. When the mobile station UE is not in the discontinuous reception state (DRX state), the operation proceeds to step S202, and when the mobile station UE is in the discontinuous reception state, the operation proceeds to step S207.

In step S202, when continuously receiving "Out-of-sync" from a physical layer $N313_{Non\ DRX}$ (a first parameter in the non-discontinuous reception state parameters) times, that is, a report of "synchronization state: NG" (S202: YES), the mobile station UE activates a timer $T313_{Non\ DRX}$ (S203). Steps S202 and S204 may be performed only when a timer $T313_{Non\ DRX}$ (a second parameter in the non-discontinuous reception state parameters) is not activated.

Meanwhile, in step S204, when continuously receiving "In-sync" through the physical layer $N315_{Non\ DRX}$ (a third parameter in the non-discontinuous reception state parameters) times, that is, a report of "synchronization state: OK" (S204 YES), the mobile station UE stops the timer $T313_{Non\ DRX}$ (S205). In addition, steps S204 and S205 may be performed only when the timer $T313_{Non\ DRX}$ is activated.

Then, when the T313Non DRX expires (step S206: YES), the operation proceeds to step S212. When the $T313_{Non\ DRX}$ does not expire (step S206: NO), the operation returns to step S201. In addition, step S206 may be performed both when the $T313_{Non\ DRX}$ is activated and when the $T313_{Non\ DRX}$ is not activated.

Meanwhile, in step S207, when continuously receiving "Out-of-sync" from the physical layer $N313_{DRX}$ (a first parameter in the discontinuous reception state parameters) times, that is, a report of "synchronization state: NG" (S207: YES), the mobile station UE activates a timer $T313_{DRX}$ (S208). In addition, steps S207 and S208 may be performed only when a timer $T313_{DRX}$ (a second parameter in the discontinuous reception state parameter) is not activated.

Meanwhile, in step S209, when continuously receiving "In-sync" from the physical layer $N315_{DRX}$ (a third parameter in the discontinuous reception state parameters) times, that is, a report of "synchronization state: OK" (S209: YES), the mobile station UE stops the timer $T313_{DRX}$ (S210). It is noted that steps S209 and S210 may be performed only when the timer $T313_{DRX}$ is activated.

Then, when the $T313_{DRX}$ expires (step S211: YES), the operation proceeds to step S212. When the $T313_{DRX}$ does not expire (step S211: NO), the operation returns to step S201. It is noted that step S211 may be performed both when the $T313_{DRX}$ is activated and when the $T313_{DRX}$ is not activated.

In step S212, the mobile station UE regards the communication state between the radio base station eNB and the mobile station UE as the radio link failure state.

In step S213, the mobile station UE clears the configuration of the communication with the radio base station eNB.

In step S214, the mobile station UE performs the reconnection process.

(Operation and Effect of the Mobile Communication System According to the First Embodiment of the Present Invention)

According to the mobile communication system in accordance with the first embodiment of the present invention, since it is possible to change the values of the discontinuous reception state parameters and the non-discontinuous reception state parameters according to whether or not the mobile station UE is in the DRX state, it can be determined with appropriate accuracy at an appropriate timing that the mobile station UE is the radio link failure state, communication quality can be stabilized, communication can be quickly re-established, and user convenience can be further improved.

(First Modification)

Figure 10:
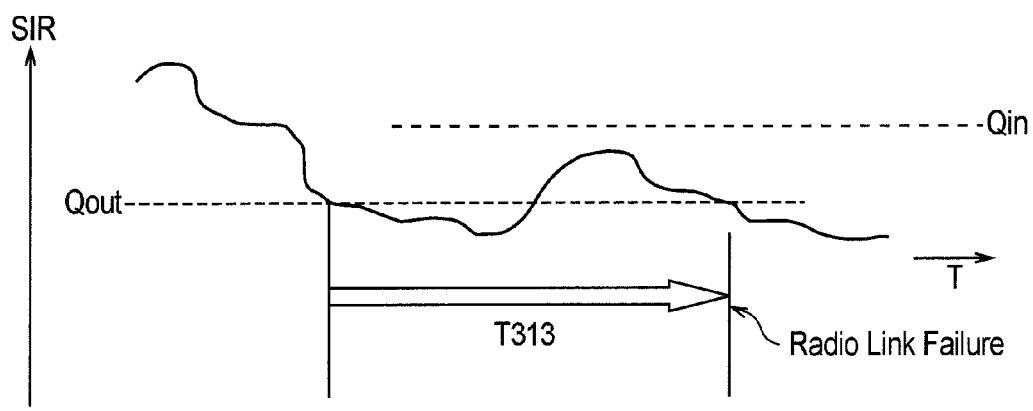
FIG. 10 is a diagram explaining how a radio link failure is determined by a radio link failure state determination unit of the mobile station according to a first modification of the present invention.
Figure 11:
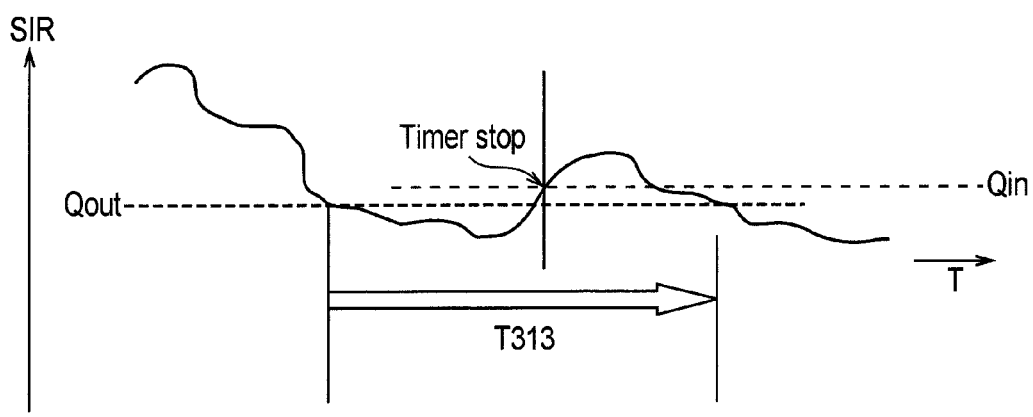
FIG. 11 is a diagram explaining how a radio link failure is determined by the radio link failure state determination unit of the mobile station according to the first modification of the present invention.

According to the first modification of the invention, it is assumed "N313=1" and "N315=1" in the above examples (FIG. 4 and FIG. 5), as shown in FIG. 10 and FIG. 11.

The second parameter "T313" in the discontinuous reception state parameter may be set to be identical to the second parameter "T313" in the non-discontinuous reception state parameter. In addition, the second parameter "T313" in the discontinuous reception state parameter may be set to be different from the second parameter "T313" in the non-discontinuous reception state parameter.

According to the former case, since there are no "N313" and "N315", a more simplified structure is achieved. Since they are controlled by the time period, when it is considered that the time period for determining that the radio link failure state has occurred in the discontinuous reception state is equal to the time for determining that the radio link failure state has occurred in the non-discontinuous reception state, appropriate control is possible.

According to the latter case, since there are no "N313" and "N315", a more simplified structure is achieved. Furthermore, based on the viewpoint that "in the case of the discontinuous reception state, since there is no data to be communicated, it is necessary to accurately determine that the radio link failure state has occurred even if it takes a time, and in the case of the non-discontinuous reception state, since there is data to be communicated, it is necessary to determine ahead of time that the radio link failure state has occurred and perform a reconnection process even if some accuracy is reduced", the "T313" may be set as different values in the discontinuous reception state and the non-discontinuous reception state.

(Second Modification)

Figure 12:
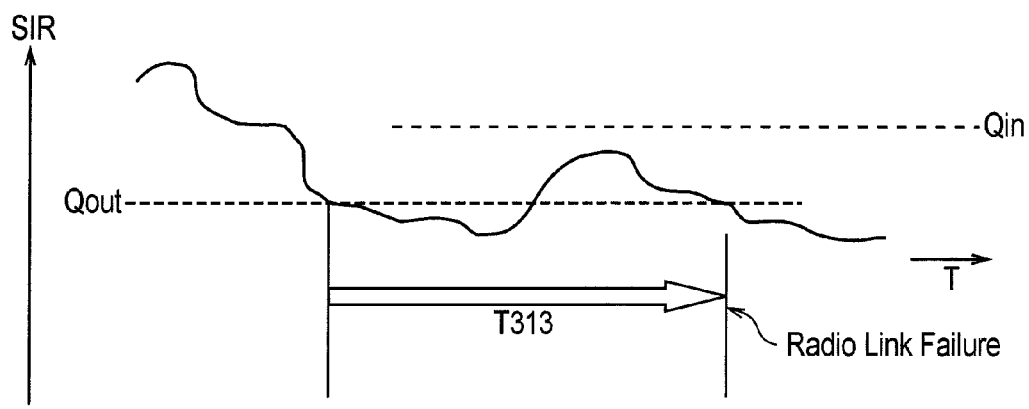
FIG. 12 is a diagram explaining how a radio link failure is determined by the radio link failure state determination unit of the mobile station according to a second modification of the present invention.
Figure 13:
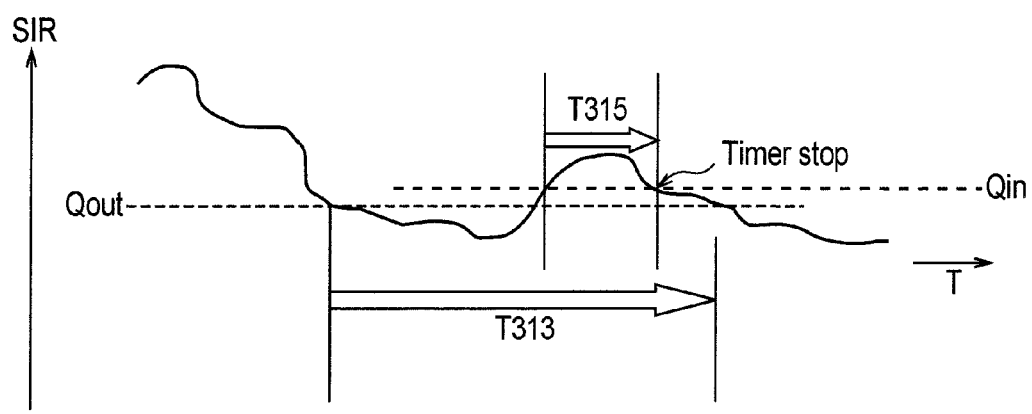
FIG. 13 is a diagram explaining how the radio link failure is determined by the radio link failure state determination unit of the mobile station according to the second modification of the present invention.
Figure 14:
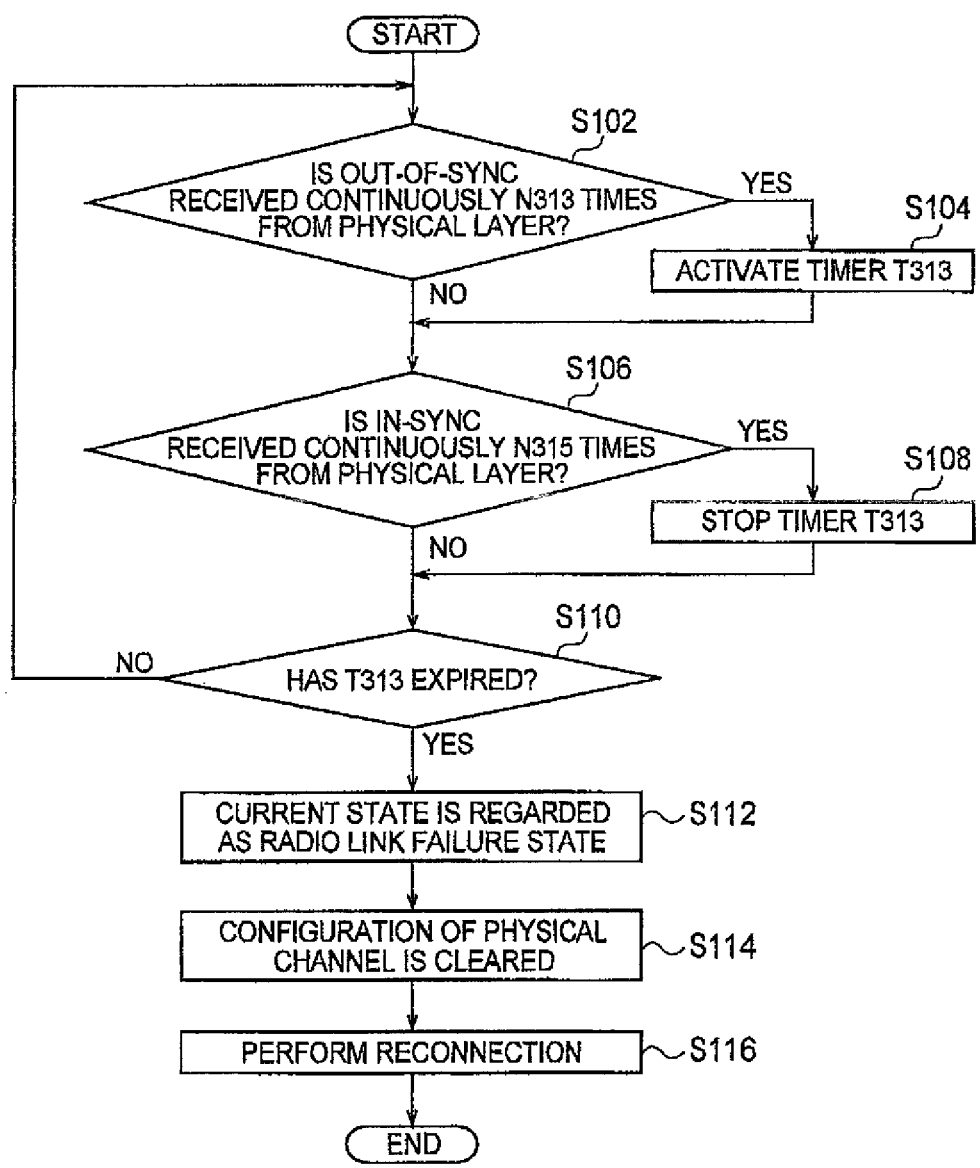
FIG. 14 is a flowchart showing the operation of a general mobile station.
Figure 15:
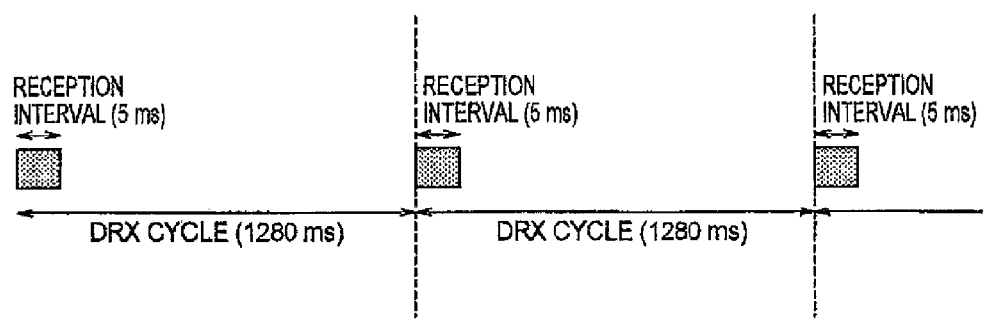
FIG. 15 is a diagram explaining a discontinuous reception in the general mobile station.

According to the second modification of the present invention, it is assumed that "N313=1" in the above examples (FIG. 4 and FIG. 5), as shown in FIG. 12 and FIG. 13.

In the second modification, "N315" is defined by a time period instead of the number of times.

Here, the first and second parameters "T313" and "N315" in the discontinuous reception state parameters may be identical to the first and second parameters "T313" and "N315" in the non-discontinuous reception state parameters respectively, and the first and second parameters "T313" and "N315" in the discontinuous reception state parameters may be different from the first and second parameters "T313" and "N315" in the non-discontinuous reception state parameters, respectively.

According to the former case, since there is no "N313", a more simplified structure is achieved. Since they are controlled by the time period, when it is considered that the time period for determining that the radio link failure state has occurred in the discontinuous reception state is equal to the time for determining that the radio link failure state has occurred in the non-discontinuous reception state, appropriate control is possible.

According to the latter case, since there is no "N313", a more simplified structure is achieved. Furthermore, based on the viewpoint that "in the case of the discontinuous reception state, since there is no data to be communicated, it is necessary to accurately determine that the radio link failure state has occurred even if it takes a time, and in the case of the non-discontinuous reception state, since there is data to be communicated, it is necessary to determine ahead of time that the radio link failure state has occurred and perform a reconnection process even if some accuracy is reduced", the "T313" and the "N315" may be set as different values in the discontinuous reception state and the non-discontinuous reception state.

(Third Modification)

In the second modification described above, "N315" is defined by the time period instead of the number of times. However, in the third modification, "N315" may be defined by the number of times.

In the above-described first embodiment, there are two types of states, that is, the discontinuous reception state and the non-discontinuous reception state. However, even when there are three types of states, that is, a long discontinuous reception state, a short discontinuous reception state, and a non-discontinuous reception state, the mobile station, the radio base station, and the mobile communication method according to the present invention can be applied thereto.

For example, when there are three types of states, that is, the long discontinuous reception state, the short discontinuous reception state, and the non-discontinuous reception state, three types of parameters, that is, the long discontinuous reception state parameter, the short discontinuous reception state parameter, and the non-discontinuous reception state parameter may be defined as the first parameter and the second parameter described above in such a manner that the respective parameters are applied to the respective states.

Furthermore, when there are three types of states, that is, the long discontinuous reception state, the short discontinuous reception state, and the non-discontinuous reception state, two types of discontinuous reception state parameter and non-discontinuous reception state parameter may be defined, the discontinuous reception state parameter may be applied to the long discontinuous reception state and the short discontinuous reception state, and the non-discontinuous reception parameter may be applied to the non-discontinuous reception state.

In addition, when there are three types of states, that is, the long discontinuous reception state, the short discontinuous reception state, and the non-discontinuous reception state, two types of long discontinuous reception state parameter and long non-discontinuous reception state parameter may be defined, the long discontinuous reception state parameter may be applied to the long discontinuous reception state, and the long non-discontinuous reception parameter may be applied to the short discontinuous reception state and the non-discontinuous reception state.

The operation of the above-described mobile station UE or radio base station eNB may be implemented by a hardware, may also be implemented by a software module executed by a processor, and may further be implemented by the combination of the both.

The software module may be arranged in a storing medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

Such a storing medium is connected to the processor so that the processor can write and read information into and from the storing medium. Such a storing medium may also be accumulated in the processor. Such a storing medium and processor may be arranged in ASIC. Such ASIC may be arranged in the mobile station UE and the radio base station eNB. As a discrete component, such a storing medium and processor may be arranged in the mobile station UE and the radio base station eNB.

Thus, the present invention has been explained in detail by using the above-described embodiments; however, it is obvious that for persons skilled in the art, the present invention is not limited to the embodiments explained herein. The present invention can be implemented as a corrected, modified mode without departing from the gist and the scope of the present invention defined by the claims. Therefore, the description of the specification is intended for explaining the example only and does not impose any limited meaning to the present invention.

The invention claimed is:

1. A mobile station communicating with a radio base station, the mobile station comprising:
   a synchronization state determination unit that determines a downlink synchronization state, based on a radio quality of a serving cell for the mobile station;
   a radio link failure state determination unit that determines whether or not a current state is a radio link failure state, based on the determination result;
   and
   a connection re-establishment unit that re-establishes a connection to the radio base station, when the radio link failure state determination unit determines that the current state is the radio link failure state,
   wherein
   when the synchronization state determination unit notifies that the downlink synchronization state is a non-synchronization state, when a first timer has expired, and when a second timer is being activated, the radio link failure state determination unit is configured to stop the second timer, and to determine that the current state is the radio link failure state;

when the synchronization state determination unit notifies that the downlink synchronization state is a non-synchronization state, when the first timer is being activated, and when the second timer is being activated, the radio link failure state determination unit is configured to stop the second timer; and when the synchronization state determination unit notifies that the downlink synchronization state is a non-synchronization state, when the first timer is not being activated, the radio link failure state determination unit is configured to start the first timer.

2. The mobile station according to claim 1, wherein
when the synchronization state determination unit notifies that the downlink synchronization state is a synchronization state, and when the second timer has expired, the radio link failure state determination unit is configured to stop the first timer; and when the synchronization state determination unit notifies that the downlink synchronization state is a synchronization state, when the first timer is being activated, and when the second timer is not being activated, the radio link failure state determination unit is configured to start the second timer.

3. The mobile station according to claim 2, wherein
the synchronization state determination unit is configured to determine the downlink synchronization state in an ON-duration of the discontinuous reception state, when the mobile station is in a discontinuous reception state; and the radio link failure state determination unit is configured to stop the first timer in the ON-duration of the discontinuous reception, which is the nearest from a timing at which the second timer has expired, when the mobile station is in a discontinuous reception state.

4. The mobile station according to claim 1, wherein
the first timer and the second timer are set separately to a discontinuous reception state and a non-discontinuous reception state, respectively.

5. The mobile station according to claim 1, wherein
the synchronization state determination unit is configured to determine the downlink synchronization state in an ON-duration of the discontinuous reception state, when the mobile station is in a discontinuous reception state; and the radio link failure state determination unit is configured to determine that the current state is the radio link failure state in the ON-duration of the discontinuous reception, which is the nearest from a timing at which the first timer has expired, when the mobile station is in a discontinuous reception state.

6. A mobile communication method for communication between a radio base station and a mobile station, the mobile communication method comprising the steps of:

(A) determining, at the mobile station, a downlink synchronization state, based on radio quality of a serving cell in the mobile station;

(B) determining, at the mobile station, whether or not a current state is a radio link failure state, based on the downlink synchronization state; and (C) re-establishing a connection to the radio base station, when it is determined that the mobile station is in the radio link failure state, wherein when it is determined that the downlink synchronization state is a non-synchronization state in the step (A), when a first timer has expired, and when a second timer is being activated, the mobile station stops the second timer and determines that the current state is the radio link failure state, in the step (B);

when it is determined that the downlink synchronization state is a non-synchronization state in the step (A), when the first timer is being activated, and when the second timer is being activated, the mobile station stops the second timer, in the step (B); and when it is determined that the downlink synchronization state is a non-synchronization state in the step (A), when the first timer is not being activated, the mobile station starts the first timer, in the step (B).

* * * * *